United States Patent
LaPat et al.

(10) Patent No.: US 7,430,292 B2
(45) Date of Patent: Sep. 30, 2008

(54) METHODS AND SYSTEMS FOR SECURING INFORMATION COMMUNICATED BETWEEN COMMUNICATION DEVICES

(75) Inventors: Ronald H. LaPat, Tyngsboro, MA (US); Randall K. Nichols, Carlisle, PA (US); Panos C. Lekkas, Worcester, MA (US); Edward J. Giorgio, Ellicott City, MD (US)

(73) Assignee: Telenublink Corporation, Andover, MA (US)

( * ) Notice: Subject to any disclaimer, the term of this patent is extended or adjusted under 35 U.S.C. 154(b) by 709 days.

(21) Appl. No.: 10/118,136

(22) Filed: Apr. 8, 2002

(65) Prior Publication Data

US 2002/0176578 A1 Nov. 28, 2002

Related U.S. Application Data

(60) Provisional application No. 60/282,536, filed on Apr. 7, 2001.

(51) Int. Cl.
*H04L 9/00* (2006.01)
(52) U.S. Cl. .......................... 380/42; 380/46
(58) Field of Classification Search .............. 380/46, 380/42
See application file for complete search history.

(56) References Cited

U.S. PATENT DOCUMENTS

| | | | | |
|---|---|---|---|---|
| 5,054,069 | A | * | 10/1991 | Maeno et al. ............... 380/265 |
| 5,142,579 | A | | 8/1992 | Anderson |
| 5,195,136 | A | * | 3/1993 | Hardy et al. ................. 380/43 |
| 5,222,136 | A | * | 6/1993 | Rasmussen et al. ........... 380/43 |
| 5,338,923 | A | | 8/1994 | Grieu |
| 5,365,588 | A | | 11/1994 | Bianco et al. |
| 5,438,622 | A | | 8/1995 | Normile et al. |
| 5,592,555 | A | | 1/1997 | Stewart |
| 5,600,720 | A | * | 2/1997 | Iwamura et al. ............... 380/46 |
| 5,708,716 | A | | 1/1998 | Tisdale et al. |
| 5,748,742 | A | | 5/1998 | Tisdale et al. |

(Continued)

FOREIGN PATENT DOCUMENTS

EP 1063811 A1 12/2000

(Continued)

OTHER PUBLICATIONS

International Search Report (8 pgs.); International Application of: Telehublink Corporation; International Application No. PCT/US02/10810; International Filing date: Apr. 6, 2002; For: Methods and Systems for Securing Information Communicated Between Communication Devices.

(Continued)

*Primary Examiner*—Gilberto Barron, Jr.
*Assistant Examiner*—Laurel Lashley
(74) *Attorney, Agent, or Firm*—Armstrong Teasdale LLP

(57) ABSTRACT

A system is provided for generating information for secure transmission from a first device to a second device. The system comprising a key scheduler for generating a dynamic secret key, a synchronization generator for generating a synchronization sequence and controlling the frequency of the dynamic secret key, a padding generator for generating a padding sequence, and a DEK generator for generating encrypted text. The system generating a stream of encrypted information that includes the synchronization sequence prior to and adjacent the encrypted text which is prior to and adjacent the padding sequence.

25 Claims, 6 Drawing Sheets

U.S. PATENT DOCUMENTS

| | | | |
|---|---|---|---|
| 5,764,767 | A | 6/1998 | Beimel et al. |
| 5,799,090 | A | 8/1998 | Angert |
| 6,009,174 | A | 12/1999 | Tatebayashi et al. |
| 6,028,933 | A | 2/2000 | Heer et al. |
| 6,035,039 | A | 3/2000 | Tisdale et al. |
| 6,055,236 | A | 4/2000 | Nessett et al. |
| 6,108,421 | A | 8/2000 | Kurdziel et al. |
| 6,151,394 | A | 11/2000 | Tatebayashi et al. |
| 6,160,890 | A | 12/2000 | Tatebayashi et al. |
| 6,240,432 | B1 | 5/2001 | Chuang et al. |
| 6,334,190 | B1 | 12/2001 | Silverbrook et al. |
| 6,345,101 | B1 | 2/2002 | Shukla |
| 7,177,424 | B1 | 2/2007 | Furuya et al. |

FOREIGN PATENT DOCUMENTS

| | | |
|---|---|---|
| WO | WO9309627 | 5/1993 |

OTHER PUBLICATIONS

Supplemental EPO Search Report, App. No. 02723782 (May 15, 2007).

* cited by examiner

METHODS AND SYSTEMS FOR SECURING INFORMATION COMMUNICATED BETWEEN COMMUNICATION DEVICES

CROSS REFERENCE TO RELATED APPLICATIONS

This application claims the benefit of U.S. Provisional Application No. 60/282,536 filed Apr. 7, 2001, which is hereby incorporated by reference in its entirety.

BACKGROUND OF THE INVENTION

This invention relates generally to methods and systems for secure information transmission and, more particularly, to securing information communicated between communication devices.

Cryptography is defined as the art and science of preventing eavesdroppers from understanding the meaning of intercepted messages. In such security minded applications, apparently random, as well as truly random number generators, may be used to support the encryption and decryption of information. These number generators are primarily employed to generate "secret keys" for use in cryptographic encoding and decoding of information.

Within the application of a number generator for creating secret keys, a set of secret numbers is used as a cryptographic key for encoding and/or decoding messages. It is important that this key not be known by unauthorized parties, nor discernible via cryptanalysis based on knowledge of messages. A sequence of apparently random numbers, or truly random numbers may be generated to manufacture a plurality of secret keys.

An "apparently random" number is definable as a number within a sequence or progression of successive numbers having a value which is neither practically reconstructible nor may the set of possible values of that particular number be substantially narrowed, even when given (1) copies of the generator algorithms; (2) non-invasive access to the equipment while generating the numbers; and (3) a complete list of all other numbers in the sequence.

Pseudo-random number generators produce a sequence of apparently random numbers utilizing a deterministic algorithm, and assume that any potential unauthorized party has neither access to nor desire to discover the generating algorithm. Pseudo-random numbers serve as an approximation to truly random numbers for a limited set of purposes. Traditional pseudo-random number generators are implemented using linear feedback shift registers or linear congruential generators using either hardware or software. Given the algorithm and current state, such as the contents of a hardware register or values of computer software variables, the output of a pseudo-random number generator may be exactly replicated. As this state information may be inferred from a one or more values within the number sequence, traditional pseudo-random number generators have substantial limitations with respect to cryptography.

Cryptographically secure pseudo-random number generators are special pseudo-random number generators designed to resist attempts to determine the current state of the generated random number sequence through analysis. These systems typically assume that unauthorized parties have complete access to the algorithm, though not to the current state values. Such generators are, however, still deterministic. As such, in the event the current state is breached by cryptoanalysis or other method, all numbers created by the generator in the future—and, in many designs, the past—may be deduced. Typically, in these systems, it is assumed that the legitimate owner of the generator may be trusted not to reveal or exploit knowledge of the current generator state. However, a defecting employee or industrial espionage may compromise a cryptographically secure generator. Thus, these generators also have substantial disadvantages.

Alternatively, a "truly random" sequence of numbers may be defined as one in which there is a theoretical basis for stating that the next number in the sequence cannot be predicted using either a mathematical or scientific method given an arbitrarily long history of the sequence behavior. In particular, a truly random number provides absolutely no pattern, correlation, or dependency among the remaining numbers in a sequence of numbers other than chance patterns. Generating truly random numbers or sequences typically relies on a chaos theory. In chaos theory, chaotically generated numbers are created by repeated experimental trials using a chaotic system with quantized outcomes, such as coin tossing or rolling dice. In a chaotic system, outcomes vary greatly and non-linearly according to minute variations of initial experimental conditions. Therefore, small sources of experimental error that are inevitably present in the physical world are magnified, thereby making it impractical to correlate system outputs, or numbers, with available measurements of system inputs, such as initial conditions. Generating large volumes of chaotic experimental results has in the past, however, required special purpose hardware, such as for example a nonlinear oscillator, which is not readily available. Furthermore, there is no guarantee against unintentionally repeating generated secret key values.

Using deterministic mathematical algorithms that compute simulations of chaotic systems has been proposed as a scheme for generating apparently random numbers. Because such simulations are computed using exactly specified numbers representing initial conditions, the source of apparent randomness due to minute variation of initial conditions is lost when performing simulations instead of physical experiments. These approaches are deterministic and therefore vulnerable and also subject to attack and compromise if the particular chaotic formula being used becomes known or deduced by cryptoanalysis.

Strategies employed in pseudo-random number generator designs have often relied upon specialized digital hardware. One such method uses a linear feedback shift register ("LFSR") for obtaining an n-bit pseudo random number by serially shifting out bits from the shift register or shift register chain during a substantially long period outside the purview of potential eavesdroppers For example, a sixty four (64) bit maximal length LFSR running at a clocked frequency of 1 MHZ could be sampled every few seconds to approximate a random number sequence. In such an example, the random number sequence will not be repeated for 585,000 years. However, this LFSR approach is still deterministic. As such, all future and past states are predictable when the present state of the shift register is known.

BRIEF DESCRIPTION OF THE INVENTION

In one aspect, a method is provided for encrypting information for communication between a first device and a second device. The method comprising generating a random number, subjecting the random number to a logical XOR component, transmitting the XOR'ed random number to a linear-feedback-shift register (LFSR) accumulator, and providing bits from the LFSR accumulator to a register.

In another aspect, a system is provided for generating information for secure transmission from a first device to a second device. The system comprising a key scheduler for generating a dynamic secret key, a synchronization generator for generating a synchronization sequence and controlling the frequency of the dynamic secret key, a padding generator for generating a padding sequence, and a DEK generator for generating encrypted text. The system generating a stream of encrypted information that includes the synchronization sequence prior to and adjacent the encrypted text prior to and adjacent the padding sequence.

In another aspect, a method is provided for encrypting information for communication between a first device and a second device. The method comprising generating a key to be utilized for at least one of encrypting and decrypting information, generating at least one encrypted synchronization sequence, generating at least one encrypted padding sequence, generating at least one encrypted cipher text message, and generating a stream of encrypted information that includes the at least one synchronization sequence prior to and adjacent the at least one cipher text message prior to and adjacent the padding sequence.

DETAILED DESCRIPTION OF THE INVENTION

Exemplary embodiments of methods and systems for secure communications between communication devices are described below. In one embodiment, a secure communication system and method is set forth for securing communications between a plurality of wireless devices, a plurality of computer systems, a plurality of other electronic communication devices, and/or a plurality of generic communication systems, which are incorporated in a telecommunications system.

More specifically, each communication device includes a secure communication system that generates a first encryption code and a second encryption code for outgoing messages. In addition, each secure communication system generates a first decryption code and a second decryption code for incoming messages. The encryption and decryption codes are synchronized for respective messages to enable secure transmission between the communication devices.

The systems and processes are not limited to the specific embodiments described herein. In addition, system and process components can be practiced independent and separate from other components described herein. Also, each component can be used in combination with other components.

Figure 1:
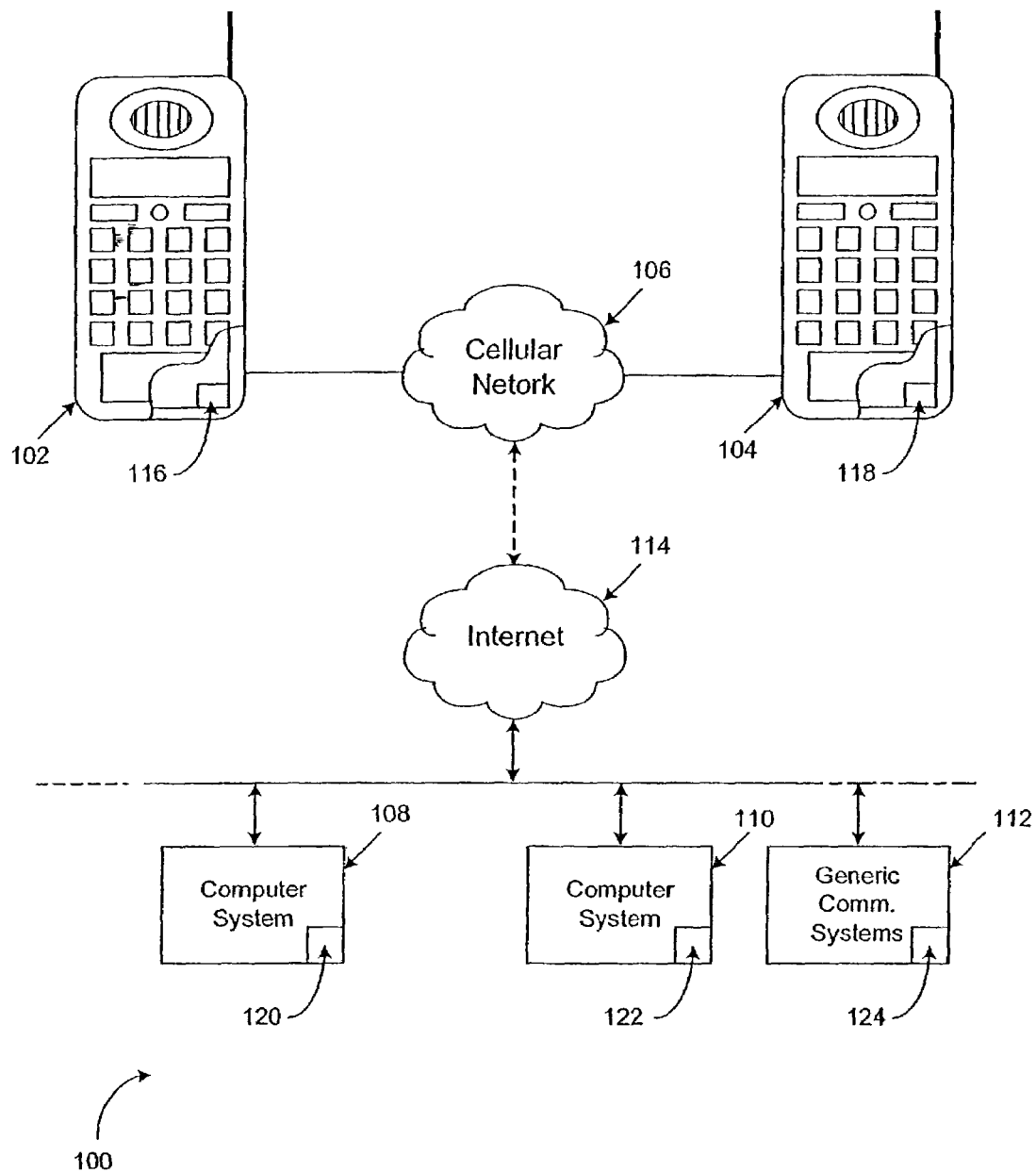
FIG. 1 is a high level block diagram of a telecommunications system.

In one embodiment and referring to FIG. 1, a telecommunications system 100 includes a first wireless communication device 102 and a second wireless communication device 104 (such as a pair of cellular telephones) coupled to each other over a wireless network 106, e.g., a cellular network. Telecommunication system 100 also includes a first computer system 108, a second computer system 110, and a generic communication system 112, such as a personal digital assistant or a pager, each coupled to wireless network 106 via a computer network 114, such as a LAN or a WAN. In one embodiment, network 114 is the Internet.

As shown in FIG. 1, wireless communication devices 102 and 104, computer systems 108 and 110, and generic communication system 112 each include a secure communication system 116, 118, 120, 122 and 124, respectively, for securing duplex or multi-party communications between wireless communication devices 102 and 104, computer systems 108 and 110, and generic communication system 112 incorporated on telecommunications system 100.

Figure 2:
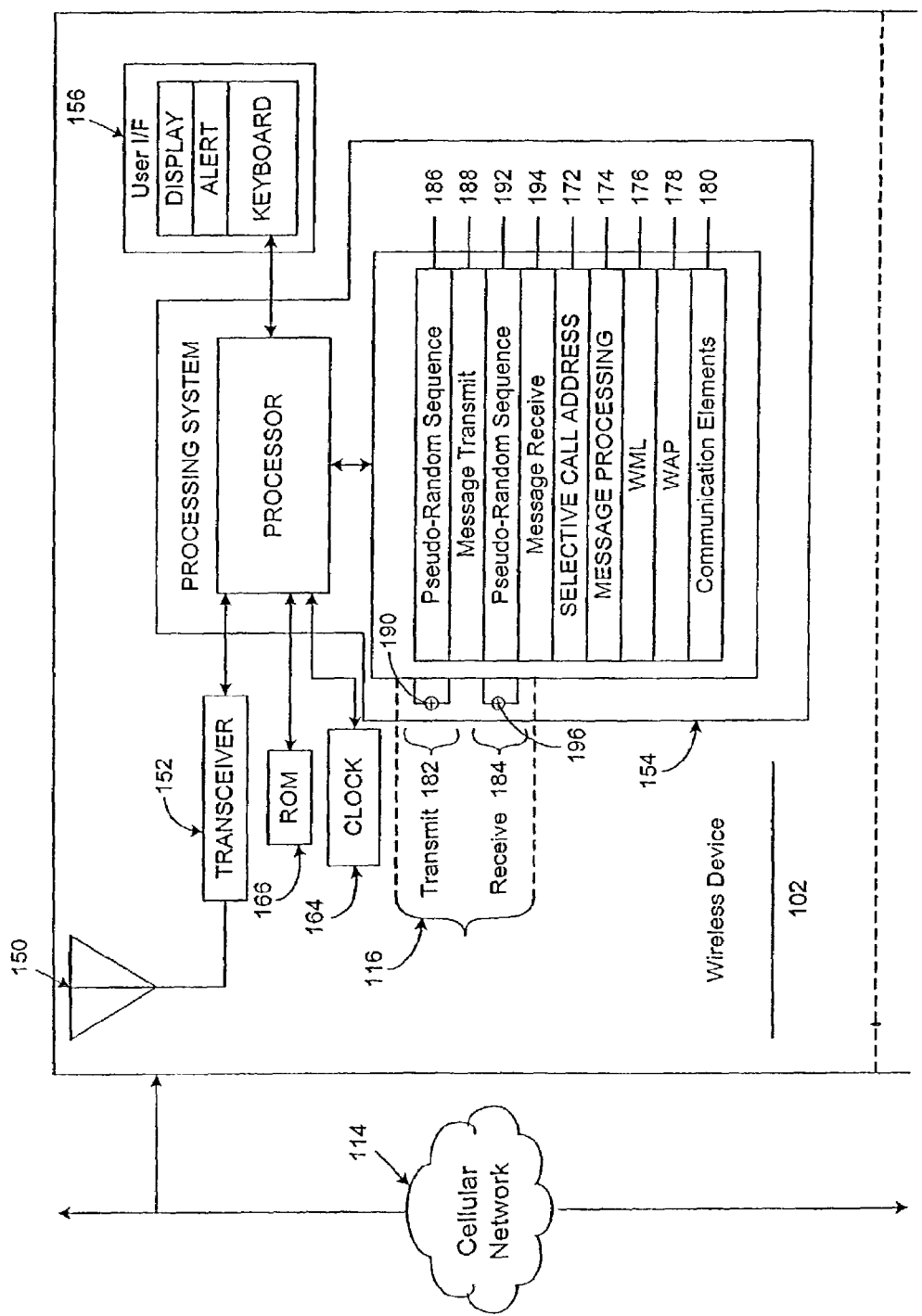
FIG. 2 is a high level functional block diagram of an exemplary wireless device incorporated on the telecommunications system shown in FIG. 1.

FIG. 2 illustrates a functional block diagram of an exemplary wireless device 102 located on telecommunication system 100 in accordance with one embodiment of the present invention. In the exemplary embodiment, wireless devices 102 and 104 are identically constructed and arranged and the structural aspects of wireless device 104 are identical to the structural aspects of wireless device 102. Therefore, only the structural aspects of wireless device 102 will be described in detail. Although in the exemplary embodiment, wireless devices 102 and 104 are identical, it should be understood that wireless devices 102 and 104 need not be identical to securely communicate using network 106.

Wireless device 102 includes an antenna 150 for transmitting and receiving messages to and from cellular network 106. Antenna 150 is coupled to a transceiver 152 for receiving an inbound message and for transmitting an outbound message. Transceiver 152 is coupled to a processing system 154 for processing the inbound and outbound messages and for controlling wireless device 102. A user interface 156 is also coupled to processing system 154 for interfacing with a user. User interface 156 includes a display 158 for displaying the inbound and outbound messages, an alert element 160 for alerting the user when the inbound message arrives, and a keyboard 162 for generating the outbound message and for controlling wireless device 102. A clock 164 is also coupled to processing system 154 for supporting time keeping requirements of wireless device 102. In addition, a read-only memory ("ROM") 166 is coupled to processing system 154. ROM 166 includes a plurality of template data for display on display 158.

Processing system 154 includes a processor 168 and a memory 170, such as a random access memory ("RAM") or a static random access memory ("SRAM"). Memory 170 includes software elements and other variables for programming processing system 154 in accordance with the exemplary embodiment. Memory 170 also includes secure communication system 116 for securing messages received and transmitted by wireless device 102, which is described further below.

Memory 170 further includes a selective call address 172 to which wireless device 102 is responsive. In addition, memory 170 includes a message processing element 174 for programming processing system 154 to process messages through well-known techniques. Memory 170 also includes wireless mark-up language ("WML") software 176 that operates according to a wireless application protocol ("WAP") 178 to enable wireless device 102 to communicate with computer systems 108 and 110 (shown in FIG. 1), as well as generic communication system 112 (shown in FIG. 1). In alternative embodiments, memory 170 includes other communication elements 180 for enabling a user to control processing system 154 to communicate with other wireless devices, such as wireless device 102 and to control processing system 154 to communicate with computer systems 108 and 110, as well as generic communication system 112.

Secure communication system 116 includes a transmit message component 182 and a receive message component 184. Transmit message component 182 includes a transmit pseudo-random sequence generator 186, a message transmit register 188, and a logical exclusive-or component 190. Receive message component 184 is similar to transmit message component 182 and includes a receive pseudo-random sequence generator 192, a message receive register 194, and a logical exclusive-or component 196.

Figure 3:
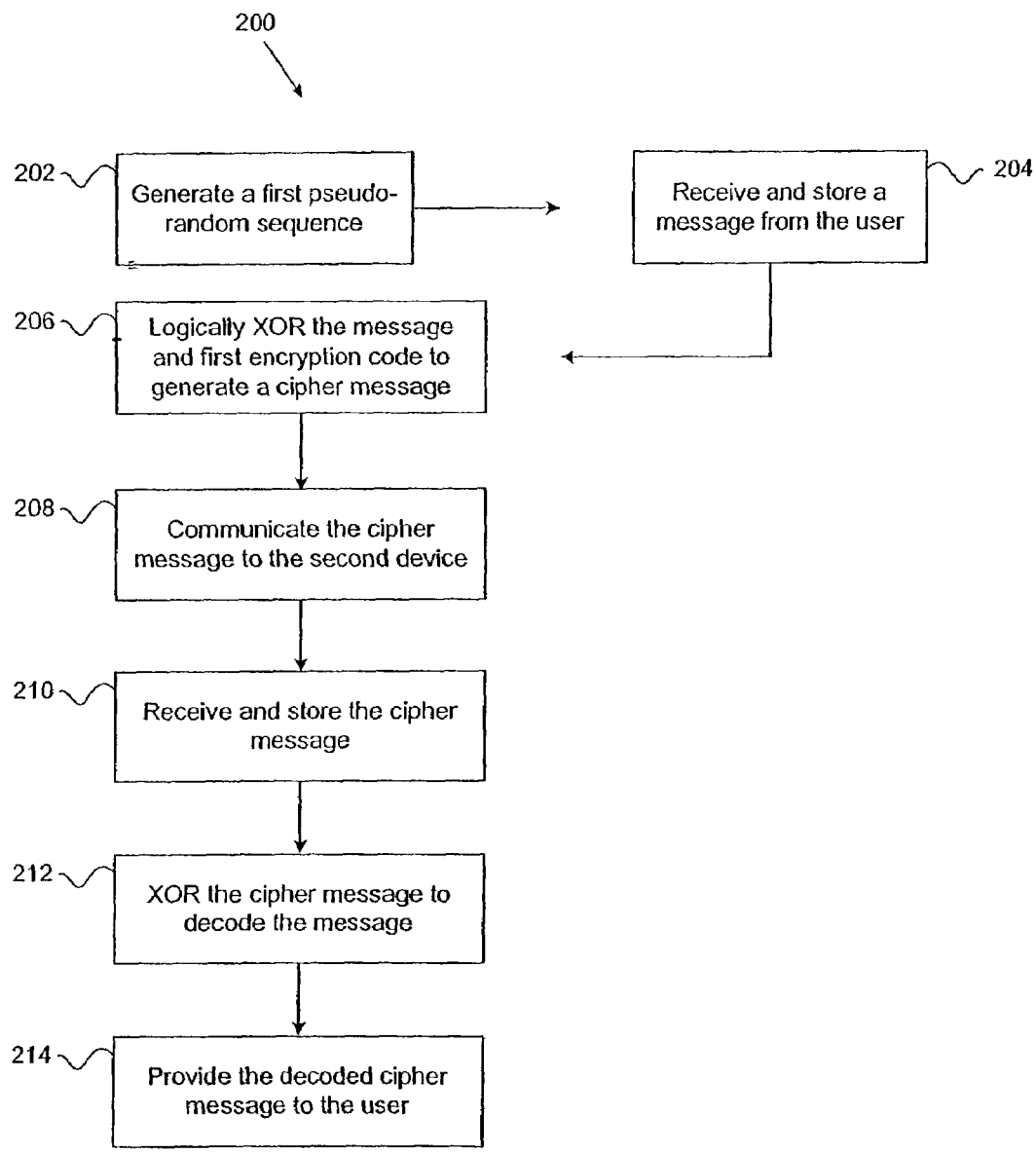
FIG. 3 is a process map for communicating information between a first wireless device and a second wireless device.

FIG. 3 illustrates a process 200 of communicating information between wireless device 102 (shown in FIG. 1) and wireless device 104 (shown in FIG. 1). It should be understood that telecommunication system 100 (shown in FIG. 1) is also adapted for bi-directional or duplex communication between any two or more of any combination of wireless devices 102 and 104, computer systems 108 and 110, and generic communication system 112.

At wireless device 102, transmit pseudo-random sequence generator 186 (shown in FIG. 2) is adapted to generate 202 a first pseudo-random sequence of digitized ones and zeros, which represents a "first encryption code". Message transmit register 188 (shown in FIG. 2) of wireless device 102 is adapted to receive and store 204 a message from a user, via user interface 156 (shown in FIG. 2). Message transmit register 188 is further adapted to formulate the message for subsequent transmission to wireless device 104 over cellular network 114 (shown in FIG. 2). In formulating the message for subsequent transmission to wireless device 104, the message and the first encryption code are logically exclusive-or'd 206 ("XOR'd") by logical XOR component 190 (shown in FIG. 2) to generate an encrypted transmit message or "cipher message". The cipher message is subsequently communicated 208 from wireless device 102 to wireless device 104 over cellular network 114.

At wireless device 104, the cipher message is received and stored 210 in message receive register 194 (shown in FIG. 2). The cipher message is again XOR'd 212 by logical XOR component 196 (shown in FIG. 2) with the first encryption code, which is generated by receive pseudo-random sequence generator 192 (shown in FIG. 2) located on wireless device 104, to decode or decrypt the cipher message. The decrypted cipher message or the original message is thereafter provided 214 to a user of wireless device 104 via user interface 156 (shown in FIG. 2).

Transmit pseudo-random sequence generator 186 located on wireless device 102 and receive pseudo-random sequence generator 192 located on wireless device 104 are similarly constructed and arranged to generate the first encryption code. The first encryption code generated by both transmit pseudo-random sequence generator 186 located on wireless device 102 and receive pseudo-random sequence generator 192 located on wireless device 104 digitally match to enable the above described logical XOR operations to respectively encode and decode the message communicated between wireless devices 102 and 104.

Figure 4:
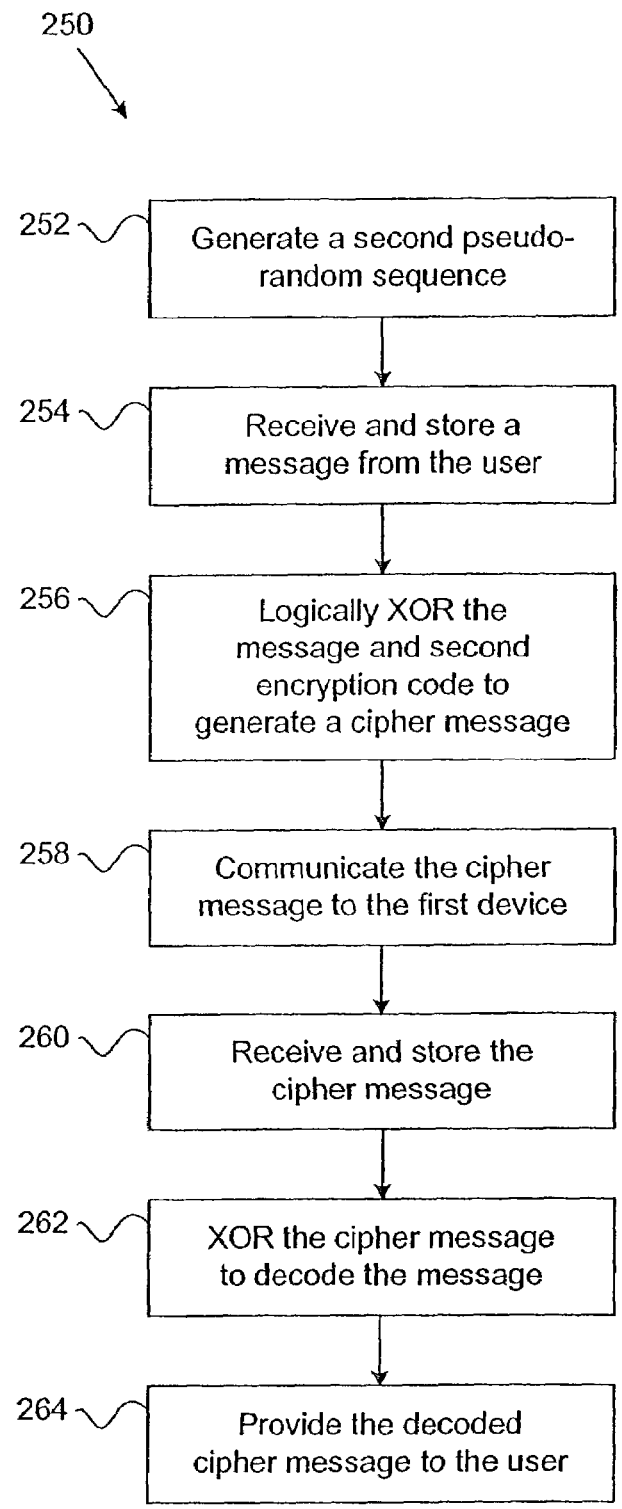
FIG. 4 is a process map for communicating information between the second wireless device and the first wireless device described in FIG. 3.

A similar process is utilized for communicating information from wireless device 104 (shown in FIG. 1) to wireless device 102 (shown in FIG. 1). FIG. 4 illustrates a process 250 of communicating information between wireless device 104 (shown in FIG. 1) and wireless device 102 (shown in FIG. 1). More specifically, transmit pseudo-random sequence generator 186 (shown in FIG. 2) located on wireless device 104 is adapted to generate 252 a second pseudo-random sequence of digitized ones and zeros, which represents a "second encryption code". Message transmit register 188 (shown in FIG. 2) of wireless device 104 is adapted to receive and store 254 a message from a user, via user interface 156 (shown in FIG. 2). Message transmit register 188 is further adapted to formulate the message for subsequent transmission to wireless device 102, over cellular network 114 (shown in FIG. 2). In formulating the message for subsequent transmission to wireless device 102, the message and the second encryption code are logically XOR'd 256 by logical XOR component 182 to generate another cipher message. The cipher message is subsequently communicated 258 from wireless device 104 to wireless device 102, over cellular network 106.

At wireless device 102, the cipher message is received and stored 260 in message receive register 194. The cipher message is again logically XOR'd 262 by logical XOR component 184 with the second encryption code, which is generated by receive pseudo-random sequence generator 192 located on wireless device 102 to decode or decrypt the cipher message. The decrypted cipher message or the original message is thereafter provided 264 to a user of wireless device 102, via user interface 156 (shown in FIG. 2).

Transmit pseudo-random sequence generator 186 located on wireless device 104 and receive pseudo-random sequence generator 192 located on wireless device 102 are similarly constructed and arranged to generate the second encryption code. The second encryption code generated by both transmit pseudo-random sequence generator located 186 on wireless device 104 and receive pseudo-random sequence generator 192 located on wireless device 102 digitally match to enable the above described XOR operations to respectively encode and decode the message(s) communicated between wireless devices 104 and 102.

In the embodiment depicted in FIGS. 3 and 4, the first encryption code and the second encryption code each include a different sequence of digitized ones and zeros to produce differently encoded or encrypted cipher messages for each respective direction of communication between wireless devices 102 and 104.

Transmit pseudo-random sequence generators 186 respectively located on wireless devices 102 and 104, as well as receive pseudo-random sequence generators 192 respectively located on wireless devices 102 and 104, are each similarly constructed and arranged, as previously described. Therefore, transmit pseudo-random sequence generators 186 and receive pseudo-random sequence generators 192 are hereinafter collectively referred to as a "PRS" generator, which will be described in detail with reference to FIG. 5.

Figure 5:
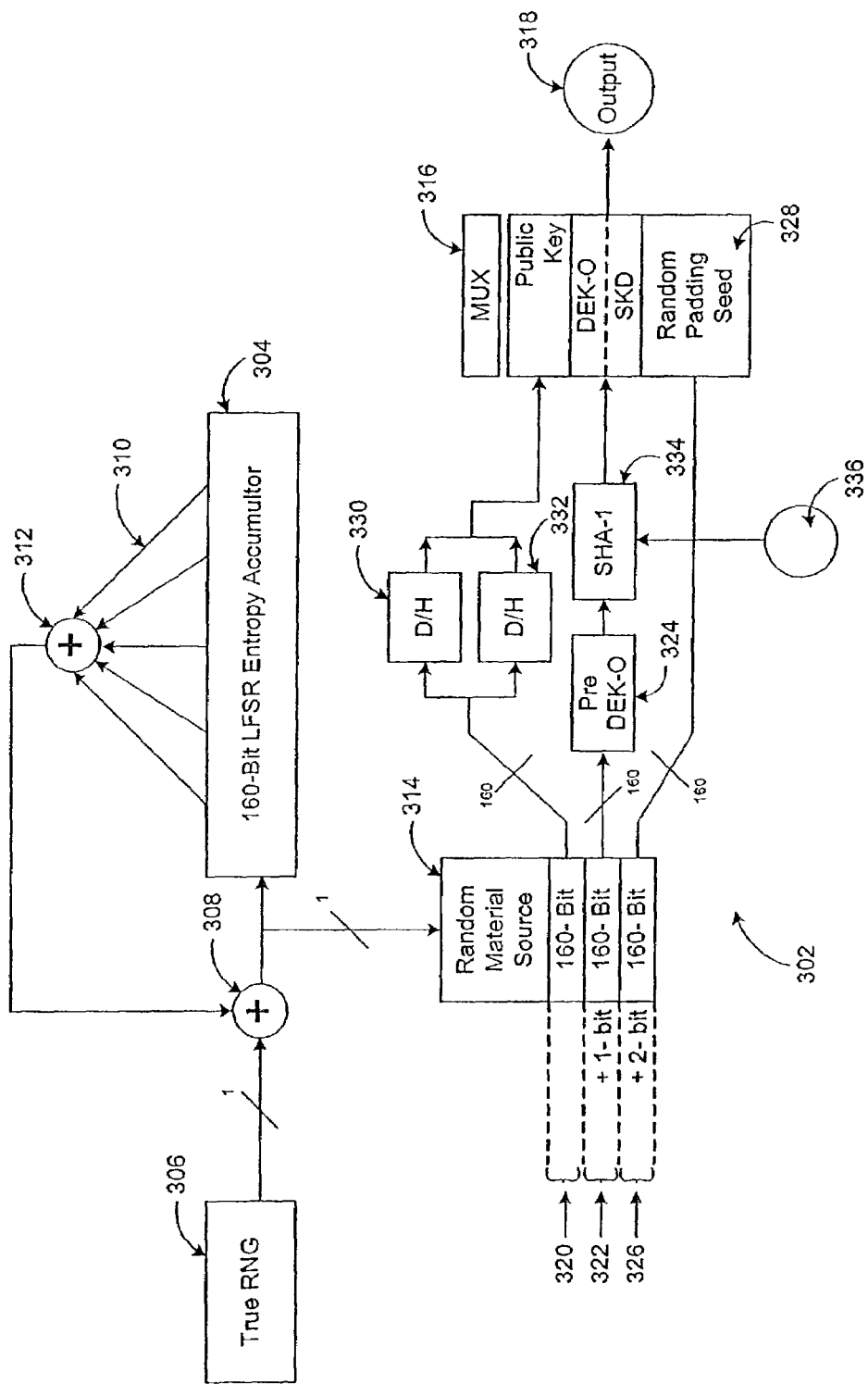
FIG. 5 is a high level functional block diagram of a portion of a secure communication system utilized with the telecommunication system shown in FIG. 1.

FIG. 5 is an exemplary embodiment of a PRS generator 300 including a front end portion 302. Front end portion 302 of PRS generator 300 includes a linear-feedback-shift-register ("LFSR") entropy accumulator 304 coupled to a true random number generator 306 via a logical XOR component 308. The LFSR entropy accumulator 304 further includes a plurality of taps 310 located at predetermined bit positions of LFSR entropy accumulator 304. In one embodiment, taps 310 are located at bit positions 1, 2, 3, 5 and 160 of LFSR entropy accumulator 304. Taps 310 are adapted to provide entropy bits from LFSR entropy accumulator 304 to a modulo-2 summing unit 312, which sums the entropy bits and provides the summed entropy bits to a random material source register 314, via XOR component 308.

The term entropy as used in this context defines the number of uncertainty bits or number of bits accumulated in LFSR entropy accumulator 304, which cannot be used to predict the next bit loaded into LFSR entropy accumulator 304. For example, if LFSR entropy accumulator 304 is 160 bits in length and the 160th bit can be predicted based on an analysis of the previous 159 bits, and the 159th bit cannot be predicted based on the previous 158 bits, then LFSR entropy accumulator 304 includes 159 entropy bits or uncertainty bits.

A multiplexer ("MUX") 316 is coupled to random material source register 314 and is adapted to receive and store the contents of random material source register 314. MUX 316 includes an output 318 for selectively outputting the contents of MUX 316.

In the embodiment shown, random material source register 314 is a 160 bit register and includes a first bit sequence 320 having 160-entropy bits or 160-entropy digitized values. The first bit sequence represents a secret key "α" or "β". The secret key α or β can be right shifted at least one bit position to permit at least one additional entropy value, which is provided from LFSR entropy accumulator 304, to be loaded into random material source register 314 to generate a second bit sequence 322. Second bit sequence 322 represents a pre-digital encryption code ("Pre-DEK-0") 324. Similarly, second bit sequence 322 contained in random material source register 314 can be right shifted at least one bit position to permit at least one additional entropy value, which is provided from LFSR entropy-accumulator 304, to be loaded into random material source register 314 to generate a third bit sequence 326. Third bit sequence 326 represents a random padding seed code 328. Random padding seed code 328 is used to initially seed a padding generation module, which will be described in detail below.

In communicating information from wireless device 102 to wireless device 104, secret key α, which is a 160 bit sequence of ones and zeros generated by front end portion 302 of PRS generator 300, is further processed by subjecting secret key α. to a conventional Diffie Hellman equation 330 to generate a public key $Y_\alpha$. Diffie Hellman equation 330, which is used to generate public key $Y_\alpha$, is characterized by the equation, $Y_\alpha = g^\alpha \mod p$, where $Y_\alpha$ is the public key; g is a generator sequence of ones and zeros that is known by both wireless devices 102 and 104 and p is a large prime number also known by both wireless devices 102 and 104.

Public key $Y_\alpha$, which is generated by wireless device 102, is communicated from wireless device 102 to wireless device 104 over cellular communication network 106. Public key $Y_\alpha$ can be intercepted by any potential eavesdroppers that intercept the communication of public key $Y_\alpha$ from wireless device 102 to wireless device 104.

At wireless device 104, the above described process for generating the secret key α is repeated for generating a secret key β. Further, the above described process for generating public key $Y_\alpha$, as described above, is also repeated for generating another public key $Y_\beta$. A Diffie Hellman equation 332, which is used to generate the public key $Y_\beta$, is characterized by the equation, $Y_\beta = g^\beta \mod p$, where $Y_\beta$ is the public key; g is the generator sequence of ones and zeros that is known by both wireless devices 102 and 104 and p is the large prime number also known by both wireless devices 102 and 104.

The public key $Y_\beta$, which is generated at wireless device 104 is communicated from wireless device 104 to wireless device 102 over cellular communication network 106. Public key $Y_\beta$ can be intercepted by any potential eavesdroppers that intercept the communication of public key $Y_\beta$ from wireless device 104 to wireless device 102.

After wireless device 104 receives public key $Y_\alpha$ from wireless device 102, wireless device 104 further processes public key $Y_\alpha$ to generate shared secret key $Y_{\alpha\beta}$, which is characterized by the equation $Y_{\alpha\beta} = (Y_\alpha)^\beta \mod p$, where $Y_\alpha$ is the public key generated by wireless device 102; β is the secret key generated at wireless device 104 and p is the large prime number, as previously described.

Similar to that described above for processing public key $Y_\alpha$ to generate shared secret key $Y_{\alpha\beta}$ after wireless device 102 receives public key $Y_\beta$ from wireless device 104, wireless device 102 further processes public key $Y_\beta$ to independently also generate shared secret key $Y_{\alpha\beta}$. Shared secret key $Y_{\alpha\beta}$ generated by wireless device 102 is characterized by the equation $Y_{\alpha\beta} = (Y_\beta)^\alpha \mod p$, where $Y_\beta$ is the public key generated by wireless device 104; α is the secret key generated at wireless device 102 and p is the large prime number, as previously described.

The above described shared secret key $Y_{\alpha\beta}$ is independently generated by both wireless devices 102 and 104 and is therefore not subject to exposure to eavesdroppers. Further, an eavesdropper cannot decipher shared secret key $Y_{\alpha\beta}$ located at wireless devices 102 and 104 without having possession of either secret key α generated by wireless device 102 or secret key β generated by wireless device 104. However, from the eavesdropper's perspective, the eavesdropper can only obtain possession of public key $Y_\alpha$ or $Y_\beta$, which cannot be used to decipher either secret key α or secret key β.

At wireless device 102, which can be defined as the master wireless device for the purpose of generating a master secret key represented as a digital encryption code "DEK-0". The master shared secret key, which is represented as DEK-0, is generated at master wireless device 102 by subjecting Pre-DEK-0 324 to a conventional Secure Hashing Algorithm ("SHA-1") 334 for further randomizing the bits included in Pre-DEK-0 324 to generate the DEK-0.

The master secret key represented by DEK-0 can be encrypted by several different keys, such as shared secret key $Y_{\alpha\beta}$ for securely communicating DEK-0 between wireless devices 102 and 104. Additionally, a shared secret key digest ("SKD"), which will be described in detail below, can similarly be employed for encrypting and securely communicating DEK-0 between wireless devices 102 and 104.

In one embodiment, shared secret key $Y_{\alpha\beta}$ is utilized to securely communicate the DEK-0, which is contained in MUX 316, from wireless device 102 to wireless device 104. In this instance, the DEK-0 is XOR'd with shared secret key $Y_{\alpha\beta}$ by logical XOR component 190 (shown in FIG. 2) for encrypting the DEK-0. Thereafter, the encrypted DEK-0 can be securely communicated to wireless device 104 over cellular network (106).

At wireless device 104, the encrypted DEK-0 is again XOR'd with shared secret key $Y_{\alpha\beta}$ by logical XOR component 196 located at wireless device 104 to decrypt the encrypted DEK-0 and to provide wireless device 104 with DEK-0. At this instant, DEK-0 is redefined as the "shared" master secret key, because DEK-0 is presently located at both wireless devices 102 and 104.

In an alternative embodiment, shared secret key $Y_{\alpha\beta}$ which is located at wireless device 102 (as well as at wireless device 104), can be further processed by subjecting shared secret key $Y_{\alpha\beta}$ 336 to SHA-1 334 for further randomizing the bits defined in shared secret key $Y_{\alpha\beta}$ 336, which is hereinafter referred to as a shared secret key digest represented above as SKD. The SKD can be similarly generated at both wireless devices 102 and 104. To securely communicate the DEK-0 from wireless device 102 to wireless device 104, the SKD is XOR'd with DEK-0 by logical XOR device 190 located at wireless device 102 for encrypting DEK-0. The encrypted DEK-0 is thereafter securely communicated to wireless device 104 over cellular network 106.

At wireless device 104, the encrypted DEK-0 is again XOR'd with the SKD by the logical XOR component 196 located at wireless device 104, to decrypt the encrypted DEK-0 and to provide the wireless device 104 with DEK-0.

As previously described, the shared master secret key is represented as DEK-0 because it is located at both wireless device 102 and wireless device 104.

Although not described above, the DEK-0 as encrypted by either the shared secret key $Y_{\alpha\beta}$ 336 or the SKD, as described above, can also be communicated from wireless device 102 to a plurality of other wireless devices (not shown), which include shared secret key $Y_{\alpha\beta}$ 336 and/or the SKD to enable the other wireless devices to securely receive DEK-0. Thereafter, the other wireless devices can encrypt a plurality of messages using DEK-0 as an encryption and/or decryption key for securely communicating the messages over cellular network 106 to other similarly configured wireless devices (not shown).

Figure 6:
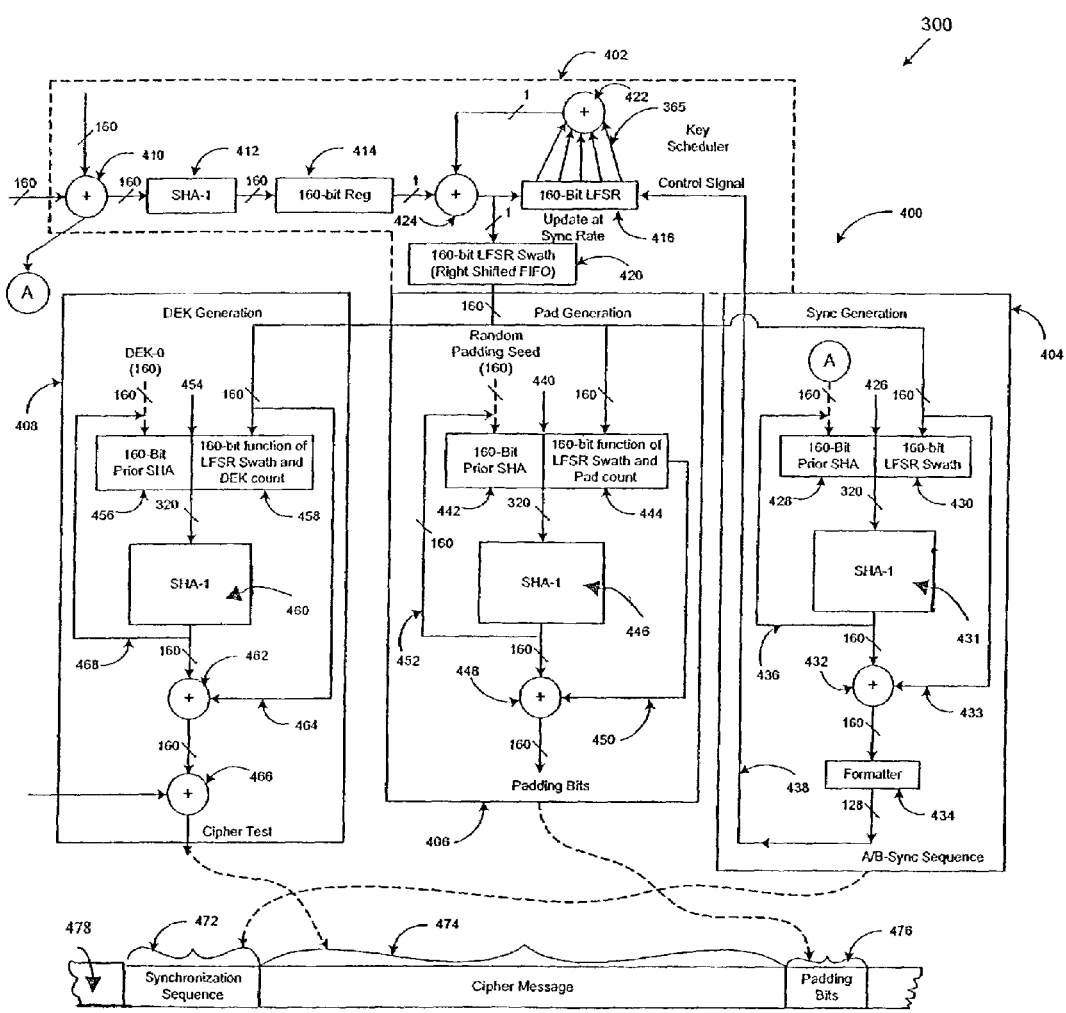
FIG. 6 is a high level functional block diagram of another portion of the secure communication system shown in FIG. 3.

FIG. 6 shows a back end portion 400 of PRS generator 300. Back end portion 400 includes a key scheduler 402 which is coupled to a synchronization generation module 404, a padding generation module 406 and a DEK generation module 408.

Key scheduler 402 includes an XOR component 410 coupled to output 318 (shown in FIG. 5) and to SHA-1 412. SHA-1 412 is coupled to a register 414. Register 414 is coupled to a first LFSR 416, via a control switch (not shown). First LFSR 416 includes a plurality of taps 418 that are coupled to a second LFSR 420, via a summing unit 422 and XOR component 424 respectively. In one embodiment, SHA-1 412, register 414, first LFSR 416 and second LFSR 420 are constructed and arranged to include a maximum bit length of 160-bits.

The synchronization generation module 404 includes a register 426 that is logically partitioned into a first portion 428 and second portion 430. First portion 428 of register 426 is coupled to XOR component 410 located on the key scheduler 402. Second portion 430 of register 426 is coupled to second LFSR 420. Register 426 is further coupled to a SHA-1 431. SHA-1 431 provides a plurality of output values to an XOR component 432 for logically XOR'ing the output values with a plurality of values provided by a feed-forward loop 433 to generate a plurality of synchronization values. A formatter module 434 is adapted to receive the synchronization values from XOR component 432 and to strip or discard a predetermined number of bits from the synchronization values. In this manner, formatter module 434 conforms the synchronization values to a predetermined format. In one embodiment, the predetermined format for the synchronization values is 128-bits.

The output values provided by SHA-1 431 of synchronization generation module 404 are further provided to first portion 428 of register 426 over a feedback line 436. Additionally, at least one bit from the synchronization values is provided to first LFSR 416 of key scheduler 402 over a control line 438 for controlling the frequency of first LFSR 416.

Padding generation module 406 is similarly constructed and arranged as synchronization generation module 404 and also includes a register 440 that is logically partitioned into a first portion 442 and second portion 444. First portion 442 of register 440 is coupled to output 318 of MUX 316. Second portion 444 of register 440 is coupled to second LFSR 420. Register 440 is further coupled to a SHA-1 446. SHA-1 provides a plurality of output values to a logical XOR component 448 for logically XOR'ing the output values provided by SHA-1 446 with a plurality of values provided by a feed-forward loop 450 to generate a plurality of padding bits or values. The output values provided by SHA-1 446 of pad generation module 406 are further provided to first portion 442 of register 440 over a feedback line 452.

DEK generation module 408 is similarly constructed and arranged as synchronization generation module 404 and padding generation module 406. DEK generation module 408 also includes a register 454 that is logically partitioned into a first portion 456 and second portion 458. First portion 456 of register 454 is also coupled to output 318 of MUX 316. Second portion 458 of register 454 is coupled to second LFSR 420. Register 454 is further coupled to a SHA-1 460. SHA-1 460 provides a plurality of output values that are provided to a logical XOR component 462 for logically XOR'ing the output values provided by SHA-1 with a plurality of values provided by a feed-forward loop 464 for generating a plurality of DEK-n values. The DEK-n values are provided to a second logical XOR component 466, which logically XOR's the DEK-n value with a message or plain text to generate encrypted text, cipher text or a cipher message. The output values provided by SHA-1 460 of DEK generation module 408 are further provided to first portion 456 of register 454 over a feedback line 468.

During operation and referring again to FIGS. 2-6, in communicating messages from wireless device 102 to wireless device 104, XOR component 410 of key scheduler 402 receives $Y_\alpha$ and DEK-0 from output 318 of MUX 316. Logical XOR component 410 logically XOR's $Y_\alpha$ and DEK-0 to generate a digital sequence, which is provided to SHA-1 412 located on key scheduler 402. SHA-1 412 processes the digital sequence by hashing or randomizing the bits defined in the digital sequence to generate a 160-bit digital forcing function, which is provided to register 414 located on key scheduler 402. Register 414 seeds first LFSR 416 one bit at a time until first LFSR 416 contains 160 digital values or bits. After first LFSR 416 is seeded with the 160 digital values or bits, register 414 is controlled to no longer provide bits to first LFSR 416.

Thereafter, first LFSR 416 provides a plurality of bits or digitized values to modulo-2 summing unit 422 over taps 418. Summing unit 422 processes the plurality of bits to generate a modulo-2 summed value. The summed value is provided to first LFSR 416, via XOR component 424. The summed value is further provided to second LFSR 420, via XOR component 424. During each successive cycle of first LFSR 416, a plurality of bits are provided to summing unit 422 for generating another summed value, which is provided to first 416 and second 420 LFSRs, as described above.

Second LFSR 420 accumulates 160 summed values, which defines a dynamic secret key $\chi$. Thereafter, as each successive summed value is provided to second LFSR 420, second LFSR 420 is right shifted by at least one bit and at least one bit is discarded to generate another dynamic secret key $\chi'$. In this manner, a dynamic secret key generation frequency is correlated to the frequency of the first LFSR 416.

Synchronization generation module 404 is adapted to receive the digital sequence generated by XOR'ing $Y_\alpha$ with DEK-0 at key scheduler 402 as described above and to store the digital sequence in first portion 428 of register 426 located on synchronization generation module 404. The digital sequence is stored in first portion 428 of register 426 during a first cycle of first 416 and second 420 LFSRs for initially seeding first portion 428 of register 404. In successive cycles, the digital sequence initially seeded in first portion 428 of register 426 is replaced with the output of SHA-1 428 over feedback line 436.

Second portion 430 of register 426 located on synchronization generation module 404 is adapted to receive dynamic secret key $\chi$ from second LFSR 420, which is located on key scheduler 402. Register 426 concatenates the digital sequence and the dynamic secret key $\chi$ to provide a 320-bit value to SHA-1 428. SHA-1 428 hashes or randomizes the 320-bit value provided by register 426 to generate a 160-bit random output sequence. The 160-bit random output sequence, which is generated by SHA-1 426, is provided to first portion 428 of register 426 over feedback line 436 once during each cycle of first 416 and second 420 LFSRs.

The 160-bit random output sequence provided by SHA-1 428 is further XOR'd by XOR component 430 with dynamic secret key χ provided over feed-forward line 432 to generate a 160-bit synchronization sequence. The 160-bit synchronization sequence is provided to a formatter 434, which formats the 160-bit synchronization sequence to provide a 128-bit synchronization sequence. In one embodiment, formatter 434 formats the 160-bit synchronization sequence by stripping 16-bits from each end of the 160-bit synchronization sequence to provide the 128-bit synchronization sequence. At least one bit from the 128-bit synchronization sequence is provided to first LFSR 416 over control line 438 for controlling the frequency of first LFSR 416, which ultimately controls the frequency of dynamic secret keys χ provided by second LFSR 420.

Padding generation module 406 is adapted to receive the random padding seed from output 318 associated with MUX 316 and to store the random padding seed in first portion 442 of register 440 located on padding generation module 406. The random padding seed is stored in first portion 442 of register 440 during a first cycle of first 416 and second 420 LFSRs for initially seeding first portion 442 of register 440. In successive cycles, the random padding seed is replaced with the output of SHA-1 446 over feedback line 452.

Similar to that previously described for second portion 430 of register 426 located on synchronization generation module 404, second portion 444 of register 440 located on padding generation module 406 is also adapted to receive dynamic secret key χ from second LFSR 420 located on key scheduler 402. Register 440 concatenates the random padding seed and dynamic secret key χ to provide a 320-bit value to SHA-1 446. SHA-1 446 hashes or randomizes the 320-bit value provided by register 440 to generate a 160-bit random output sequence. The 160-bit random output sequence provided by SHA-1 440 is XOR'd by logical XOR component 448 with dynamic secret key χ provided over feed-forward line 450 to generate a 160-bit padding sequence.

DEK generation module 408 is adapted to receive the DEK-0 sequence from output 318 associated with MUX 316 and to store the DEK-0 sequence in first portion 456 of register 454 located on DEK generation module 408. The DEK-0 sequence is stored in first portion 456 of register 454 during a first cycle of first 416 and second 420 LFSRs for initially seeding first portion 456 of register 454. In successive cycles, the DEK-0 sequence initially seeded in first portion 456 of register 454 is replaced with the output of SHA-1 460 over feedback line 468.

Again similar to that previously described for second portion 430 of register 426 located on synchronization generation module 404, second portion 458 of register 454 located on DEK generation module 408 is adapted to receive dynamic secret key χ from second LFSR 420 located on key scheduler 402. Register 454 concatenates the DEK-0 sequence and dynamic secret key χ to provide a 320-bit sequence to the SHA-1 460. SHA-1 460 hashes or randomizes the 320-bit sequence provided by register 454 to generate a 160-bit random output sequence. The 160-bit random output sequence provided by SHA-1 460 is provided to first portion 456 of register 454 over feedback line 468 once during each cycle of first 416 and second 420 LFSRs.

Furthermore, the 160-bit random output sequence provided by the SHA-1 460 is logically XOR'd, by logical XOR component 462, with dynamic secret key χ provided over feed-forward line 464 to generate a 160-bit DEK-n sequence. The 160-bit DEK-n sequence is XOR'd by XOR component 466 with plain text, e.g. message to be encrypted, to generate an encrypted message or a cipher message.

As previously described above, the cipher message is thereafter packaged in accordance with a predetermined data structure 470 and communicated to wireless device 104 over cellular network 106. At wireless device 104, the received cipher message is XOR'd with public key $Y_\alpha$, which is stored on wireless device 104, for decrypting the cipher message to provide a user of wireless device 104 with the original plain text, via user interface 156. During transmission of messages from wireless device 104 to wireless device 102, the above described process is repeated except public key $Y_\alpha$ described at the commencement of the above described process is replaced with public key $Y_\beta$.

Using public key $Y_\alpha$, having a first digitized sequence in communications originating from wireless device 102 for communicating cipher messages to wireless device 104 and using public key $Y_\beta$ having a second digitized sequence in communications originating from wireless device 104 for communicating cipher messages to wireless device 102 results in duplex communication between wireless devices 102 and 104, which include different public keys ($Y_\alpha$ or $Y_\beta$) for each direction of communication.

In the embodiment shown in FIG. 6, data structure 470 can include a synchronization sequence 472 having a plurality of digitized bits; cipher text or cipher message 474 having a plurality of digitized bits and a padding sequence 476 also including a plurality of digitized bits. Although padding sequence 476 is shown as a plurality of digitized bits following cipher message 474 in data structure 470, it should be realized that padding sequence 476 can be distributed between following cipher message 474 in data structure 470 and a space 478 preceding synchronization sequence 472.

In this embodiment, data structure 470 includes 1280-digitized bits, synchronization sequence 472 includes 128-digitized bits, cipher message 474 includes 1024-digitized bits and padding sequence 476 includes 128-digitized bits.

Although synchronization generation module 404, padding generation module 406 and DEK generation module 408 include individual modules, it should be understood that each function achieved by synchronization generation module 404, padding generation module 406 and DEK generation module 408 can be accomplished using a single generic module (not shown) that is time multiplexed for each function described above.

It should be further understood that the various components of the above described secure communication system 116, 118, 120, 122, and 124 for securing duplex or multi-party communications between wireless devices 102 and 104, computer systems 108 and 110, as well as generic communication system 112 incorporated on telecommunications system 100, can be implemented using hardware or software.

While the invention has been described in terms of various specific embodiments, those skilled in the art will recognize that the invention can be practiced with modification within the spirit and scope of the claims.

What is claimed is:

1. A method for encrypting information for communication between a first device and a second device, said method comprising:

generating a random number in the first device;

subjecting the random number to a logical XOR component in the first device;

transmitting the XOR'ed random number to a linear-feedback-shift register (LFSR) accumulator in the first device;

providing bits from the LFSR accumulator to a register in the first device; and transmitting an output from the register to a second linear-feedback-shift register in the first device.

2. A method in accordance with claim 1 further comprising utilizing taps to provide the bits from the LFSR accumulator to the register.

3. A method in accordance with claim 1 further comprising providing bits from the LFSR accumulator to the register through the XOR component.

4. A method in accordance with claim 1 further comprising:

receiving and storing the contents of the register in a multiplexer; and selectively outputting the contents of the multiplexer.

5. A method in accordance with claim 1 wherein the register is located at a first device and the first device register has a first bit sequence having pre-determined number of values, the first bit sequence representing a secret key $\alpha$, said method further comprising the steps of:

shifting the first bit sequence at least one bit position to generate a first at least one additional value;

loading the first at least one additional value onto the first device register; and generating a second bit sequence with the first device register utilizing the first at least one additional value.

6. A method in accordance with claim 5 further comprising the steps of:

shifting the second bit sequence at least one position to generate a second at least one additional value;

loading the second at least one additional value onto the first device register; and generating a third bit sequence with the first device register utilizing the second at least one additional value.

7. A method in accordance with claim 5 further comprising subjecting the secret key $\alpha$ to a conventional Diffie Hellman equation to generate a public key $Y_\alpha$, wherein the Diffie Hellman equation is characterized by the equation, $Y_\alpha = g^\alpha \mod p$, where $Y_\alpha$ is the public key; g is a generator sequence of ones and zeros known to the first device and the second device, and p is a large prime number known to the first device and the second device.

8. A method in accordance with claim 7 further comprising communicating the public key $Y_\alpha$ from the first device to the second device.

9. A method in accordance with claim 7 wherein the register is located at a second device and the second device register has a first bit sequence having pre-determined number of values, the second device register first bit sequence representing a secret key $\beta$, further comprising subjecting the secret key $\beta$ to a conventional Diffie Hellman equation to generate a public key $Y_\beta$, wherein the Diffie Hellman equation is characterized by the equation, $Y_\beta = g^\beta \mod p$, where $Y_\beta$ is the public key; g is the generator sequence, and p is the large prime number.

10. A method in accordance with claim 9 further comprising communicating the public key $Y_\beta$ from the second device to the first device.

11. A method in accordance with claim 9 further comprising processing, at the second device, the public key $Y_\alpha$ to generate a shared secret key $Y_{\alpha\beta}$ utilizing the equation $Y_{\alpha\beta} = (Y_\alpha)^\beta \mod p$.

12. A method in accordance with claim 11 further comprising processing, at the first device, the public key $Y_\beta$ to generate a shared secret key $Y_{\alpha\beta}$ utilizing the equation $Y_{\alpha\beta} = (Y_\beta)^\alpha \mod p$.

13. A method in accordance with claim 12 further comprising:

subjecting the second bit sequence to a secure hashing algorithm to generate a DEK-0 at the first device; and communicating the DEK-0 from the first device to the second device.

14. A method in accordance with claim 5 further comprising:

subjecting the second bit sequence to a secure hashing algorithm to generate a DEK-0 at the first device; and communicating the DEK-0 from the first device to the second device.

15. A method in accordance with claim 13 further comprising XOR'ing the DEK-0 at the first device with the shared secret key $Y_{\alpha\beta}$ to encrypt the DEK-0.

16. A method in accordance with claim 15 further comprising XOR'ing the received DEK-0 at the second device to decrypt the encrypted DEK-0.

17. A method in accordance with claim 13 further comprising:

subjecting the shared secret key $Y_{\alpha\beta}$ to the secure hashing algorithm to generate a shared secret key digest; and XOR'ing the shared secret key digest with the DEK-0 to encrypt the DEK-0.

18. A method in accordance with claim 17 further comprising XOR'ing, at the second device, the DEK-0 with the shared secret key digest to decrypt the DEK-0.

19. A system for encrypting information for communication between a plurality of devices, said system comprising:

a first communication device and a second communication device; said first communication device comprising:

a random number generator;

a logical XOR component coupled to said random number generator;

a linear-feedback-shift register (LFSR) accumulator coupled to said logical XOR component;

a register coupled to said LFSR accumulator;

a multiplexer coupled to said register; and a second linear-feedback-shift register operatively coupled to said register, said multiplexer transmitting an output from the register to said second linear-feedback-shift register.

20. A system in accordance with claim 19 further comprising a summing unit, said LFSR comprising a plurality of taps adapted to provide bits from said LFSR to said summing unit.

21. A system in accordance with claim 20 wherein said register is located at said first device and includes a first bit sequence having a pre-determined number of values, the first bit sequence representing a first key $\alpha$, said system configured to:

shift the first bit sequence at least one bit position to generate a first additional value;

load the first additional value onto said first device register; and generate a second bit sequence with said first device register utilizing the first additional value.

22. A system in accordance with claim 21 further configured to:

shift the second bit sequence at least one position to generate a second additional value;

load the second additional value onto said first device register; and generate a third bit sequence with said first device register utilizing the second additional value.

23. A system in accordance with claim 21 further configured to subject the first key α to a conventional Diffie Hellman equation to generate a second key $Y_\alpha$, wherein the Diffie Hellman equation is characterized by the equation, $Y_\alpha = g^\alpha \mod p$, where $Y_\alpha$ is the second key; g is a generator sequence of ones and zeros known to said first device and said second device, and p is a large prime number known to said first device and said second device.

24. A system in accordance with claim 23 wherein said second device comprises a register having a first bit sequence having pre-determined number of values, the second device register first bit sequence representing a third key β, said system further configured to subject the third key β to a conventional Diffie Hellman equation to generate a fourth key $Y_\beta$, wherein the Diffie Hellman equation is characterized by the equation, $Y_\beta = g^\beta \mod p$, where $Y_\beta$ is the fourth key; g is the generator sequence, and p is the large prime number.

25. A system in accordance with claim 24 further configured to:
- process, at said second device, the second key $Y_\alpha$ to generate a shared secret key $Y_{\alpha\beta}$ utilizing the equation $Y_{\alpha\beta} = (Y_\alpha)^\beta \mod p$; and
- process, at said first device, the fourth key $Y_\beta$ to generate a shared secret key $Y_{\alpha\beta}$ utilizing the equation $Y_{\alpha\beta} = (Y_\beta)^\alpha \mod p$.

* * * * *

UNITED STATES PATENT AND TRADEMARK OFFICE
CERTIFICATE OF CORRECTION

PATENT NO. : 7,430,292 B2  
APPLICATION NO. : 10/118136  
DATED : September 30, 2008  
INVENTOR(S) : LaPat et al.

It is certified that error appears in the above-identified patent and that said Letters Patent is hereby corrected as shown below:

Title Page, Item (73), Assignee: delete "Telenublink" and insert therefor --Telehublink--.

Column 12, line 64 cancel the text beginning with "1. A method for encrypting" to and ending "register in the first device." in column 13, line 9 and insert the following claim:

--1. A method for encrypting information for communication between a first device and a second device, said method comprising:

generating a random number in the first device;

subjecting the random number to a logical XOR component in the first device;

transmitting the XOR'ed random number to a linear-feedback-shift register (LFSR) accumulator in the first device;

providing bits from the LFSR accumulator to a summing unit and generating summed bits in the first device;

transmitting the summed bits to the logical XOR component in the first device;

transmitting the XOR'ed random number to a random material source register in the first device;

transmitting a bit sequence from the random material source register to a multiplexer in the first device; and transmitting an output from the multiplexer to at least one of:

a plurality of linear-feedback-shift registers in the first device;

a padding generation module in the first device;

a DEK generation module in the first device; and a synch generation module in the first device.--

Signed and Sealed this

Thirtieth Day of November, 2010

David J. Kappos  
*Director of the United States Patent and Trademark Office*

CERTIFICATE OF CORRECTION (continued)
U.S. Pat. No. 7,430,292 B2

Column 13, line 12 delete "register." and insert therefore --summing unit, wherein the LFSR accumulator is a LRSR entropy accumulator, the summing unit is a modulo-2 summing unit, and the summed bits are summed entropy bits.--.

Column 13, line 13 cancel the text beginning with "3. A method in accordance with claim 1" to and ending "XOR component." in column 13, line 15 and insert the following claim:

3. Canceled

Column 13, line 16 cancel the text beginning with "4. A method in accordance with claim 1" to and ending "contents of the multiplexer." in column 13, line 20 and insert the claim:

--4. A method in accordance with claim 1 wherein transmitting a bit sequence from the random material source register to the multiplexer in the first device comprises:

receiving and storing the contents of the random material source register in the multiplexer; and selectively outputting the contents of the multiplexer.--.

Column 13, line 21 cancel the text beginning with "5. A method in accordance with claim 1" to and ending "one additional value." in column 13, line 31 and insert the claim:

--5. A method in accordance with claim 1 further comprising:

generating a first bit sequence within the random material source register having a pre-determined number of values, the first bit sequence representing a secret key α; and shifting the first bit sequence at least one bit position to generate a second bit sequence representing a pre-DEK-0 signal.--.

Column 13, line 32 cancel the text beginning with "6. A method in accordance with claim 5" to and ending "one additional value." in column 13, line 39 and insert the claim:

--6. A method in accordance with claim 5 further comprising shifting the second bit sequence at least one position to generate a third bit sequence representing a random padding seed.--.

Column 13, line 51 cancel the text beginning with "9. A method in accordance with claim 7" to and ending "prime number." in column 13, line 60 and insert the claim:

--9. A method in accordance with claim 7 wherein a random material source register is located at the second device and the second device random material source register has a first bit sequence having a pre-determined number of values, the second device random material source register first bit sequence representing a secret key β, further comprising subjecting the secret key β to a conventional Diffie Hellman equation to generate a public key $Y_\beta$, wherein the Diffie Hellman equation is characterized by the equation, $Y_\beta = g^\beta \mod p$, where $Y_\beta$ is the public key; g is the generator sequence, and p is the large prime number.--.

CERTIFICATE OF CORRECTION (continued)
U.S. Pat. No. 7,430,292 B2

Column 14, line 32 cancel the text beginning with "19. A system for encrypting" to and ending "shift register." in column 14, line 47 and insert the claim:

--19. A system for encrypting information for communication between a plurality of devices, said system comprising:

a first communication device and a second communication device, said first communication device comprising:

a random number generator;

a linear-feedback-shift register (LFSR) accumulator coupled to said random number generator;

a random material source register coupled to said LFSR accumulator;

a multiplexer coupled to said random material source register, wherein said multiplexer is coupled to at least one of:

a key scheduler comprising a plurality of LFSRs, a plurality of first logical XOR components, a summing unit, a first secure hashing algorithm, and a register;

a padding generation module, said padding generation module is coupled to said plurality of LFSRs;

a DEK generation module, said DEK generation module is coupled to said plurality of LFSRs; and a synch generation module, said synch generation module is coupled to said plurality of LFSRs, wherein each of said padding generation, DEK generation, and synch generation modules comprise a dual-portioned register, a second secure hashing algorithm, and at least one second logical XOR component.--.

Column 14, line 48 cancel the text beginning with "20. A method in accordance with claim 19" to and ending "summing unit." in column 14, line 50 and insert the claim:

--20. A system in accordance with claim 19 further comprising a plurality of modulo-2 summing units, wherein said LFSR accumulator is an LFSR entropy accumulator, wherein said LFSR entropy accumulator and at least one of said plurality of LFSRs comprise a plurality of taps adapted to provide bits from each of said LFSR entropy accumulator and at least one of said plurality of LFSRs to at least one of said plurality of modulo-2 summing units.--.

Column 14, line 51 cancel the text beginning with "21. A method in accordance with claim 20" to and ending "additional value." in column 14, line 61 and insert the claim:

--21. A system in accordance with claim 20 wherein said random material source register is located at said first device and includes a first bit sequence having a pre-determined number of values, the first bit sequence representing a secret key $\alpha$, said system configured to shift the first bit sequence at least one bit position to generate a second bit sequence representing a pre-DEK-0 signal.--.

Column 14, line 62 cancel the text beginning with "22. A method in accordance with claim 21" to and ending "additional value." in column 15, line 2 and insert the claim:

--22. A system in accordance with claim 21 further configured to shift the second bit sequence at least one position to generate a third bit sequence representing a random padding seed.--.

Column 15, line 5, delete "second key" and insert therefor --public key--.

Column 15, line 7, delete "second key" and insert therefor --public key--.

Column 15, line 11 cancel the text beginning with "24. A system in accordance with claim 23" to and ending "prime number." in column 16, line 5 and insert the claim:

--24. A system in accordance with claim 23 wherein said second device comprises a random material source register having a first bit sequence having pre-determined number of values, the second device random material source register first bit sequence representing a secret key $\beta$, said system further configured to subject the secret key $\beta$ to a conventional Diffie Hellman equation to generate a public key $Y_\beta$, wherein the Diffie Hellman equation is characterized by the equation, $Y_\beta = g^\beta \mod p$, where $Y_\beta$ is the public key; g is the generator sequence, and p is the large prime number.--.

Column 16, line 8, delete "second key" and insert therefor --secret key--.

Column 16, line 11, delete "fourth key" and insert therefor --secret key--.